(12) United States Patent
Hong et al.

(10) Patent No.: US 7,030,942 B2
(45) Date of Patent: Apr. 18, 2006

(54) LIQUID CRYSTAL DISPLAY DEVICE HAVING PRINTED CIRCUIT BOARD AFFIXED TO SUPPORTER MAIN AND METHOD OF FABRICATING THE SAME

(75) Inventors: Sun Geol Hong, Kyoungsangbuk-do (KR); Gi Suck Kwon, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 95 days.

(21) Appl. No.: 10/606,800

(22) Filed: Jun. 27, 2003

(65) Prior Publication Data

US 2004/0119906 A1   Jun. 24, 2004

(30) Foreign Application Priority Data

Dec. 20, 2002   (KR) .................... 10-2002-0081813

(51) Int. Cl.
  *G02F 1/1333*   (2006.01)
(52) U.S. Cl. ................... 349/58; 349/60; 349/149
(58) Field of Classification Search ............... 349/150, 349/58, 60, 149
  See application file for complete search history.

(56) References Cited

U.S. PATENT DOCUMENTS

| | | | | |
|---|---|---|---|---|
| 4,006,968 A | * | 2/1977 | Ernstoff et al. | 349/105 |
| 4,357,061 A | * | 11/1982 | Crosby | 439/66 |
| 5,897,188 A | * | 4/1999 | Sasuga et al. | 349/150 |
| 5,946,195 A | * | 8/1999 | Hashimoto | 361/774 |
| 6,105,215 A | * | 8/2000 | Lee | 24/458 |
| 6,478,622 B1 | * | 11/2002 | Hwang | 439/607 |

* cited by examiner

*Primary Examiner*—Andrew Schechter
*Assistant Examiner*—Michael H. Caley
(74) *Attorney, Agent, or Firm*—Morgan, Lewis & Bockius LLP

(57) ABSTRACT

A liquid crystal display device includes a liquid crystal display panel having a plurality of liquid crystal cells arranged in a matrix configuration, a printed circuit board having a drive circuit mounted thereon to drive the liquid crystal display panel, a supporter main for supporting the liquid crystal display panel, at least one hole formed in the printed circuit board, and at least one projected parts protruding from the supporter main, wherein the projected part is inserted into the hole to affix the printed circuit board to the supporter main.

14 Claims, 4 Drawing Sheets

LIQUID CRYSTAL DISPLAY DEVICE HAVING PRINTED CIRCUIT BOARD AFFIXED TO SUPPORTER MAIN AND METHOD OF FABRICATING THE SAME

The present invention claims the benefit of Korean Patent Application No. P2002-81813 filed in Korea on Dec. 20, 2002, which is hereby incorporated by reference.

BACKGROUND OF THE INVENTION

1. Field of the Invention

The present invention relates to a display device and a method of fabricating a display device, and more particularly to a liquid crystal display device and a method of fabricating a liquid crystal display device.

2. Description of the Related Art

In general, liquid crystal display (LCD) devices include a flat panel to display images by adjusting light transmittance of a liquid crystal material. In addition, the LCD devices are light weight, has a thin profile, and have low power consumption. Accordingly, the LCD devices are incorporated in may mobile communication devices and in notebook computers. Thus, significant research is currently being conducted to provide LCD devices having a wide screen, high definition, and low power consumption.

FIG. 1 is a perspective construction view of a liquid crystal display device according to the related art, and FIG. 2 is a diagram showing a rear supporter main of the printed circuit board of FIG. 1 according to the related art. In FIGS. 1 and 2, an LCD has a supporter main 44 made of a plastic material and a case top 32 made of a metal material that is combined with the supporter main 44. The supporter main 44 has a reflection sheet 42, a backlight unit 40, and optical sheets 38 sequentially stacked on its surface, wherein the optical sheets 38 include a liquid crystal display panel 36 and a polarizer 34. Accordingly, stepped portions of the case top are provided with a plurality of grooves formed on both side walls, wherein a combination screw 60 is inserted into the grooves to combine the supporter main 44 with the case top 32 within the supporter main 44.

The reflection sheet 42 guides light produced from the backlight unit 40 toward the liquid crystal display panel 36. The optical sheets 38 direct the incident light from a surface of the reflection sheet 42 to the liquid crystal display panel 36 along a vertical direction. In addition, the polarizer 34 expands the viewing angle of images displayed on the liquid crystal display panel 36.

A plurality of liquid crystal cells are arranged in an active matrix between upper and lower glass substrates of the liquid crystal display panel 36, wherein each of the liquid crystal cells includes a thin film transistor for switching a video signal. The refractive index of each of the liquid crystal cells is changed in accordance with the video signal, so the images corresponding to the video signal are displayed. Accordingly, tape carrier packages (TCP) 52 and 56, which include driver integrated circuits for supplying drive signals to the thin film transistors, are mounted to the lower substrate of the liquid crystal display panel 36.

The TCP's 52 and 56 are divided into a printed circuit board 54 for supplying the video signal to data lines of the liquid crystal display panel 36, a data TCP 56 adhered to a data pad on the lower substrate and having a data drive integrated circuit mounted thereon, wherein the data drive integrated circuit supplies the video signals to the data lines in response to a control signal received from the printed circuit board 54, and a gate TCP 52 adhered to a gate pad on the lower substrate and having a gate drive integrated circuit mounted thereon, wherein the gate drive integrated circuit supplies the gate signals to the gate lines in response to a control signal received from the printed circuit board 54. The TCPs 52 and 56 are folded to cover a side surface of the supporter main 44. Accordingly, the printed circuit board 54 with the data TCP 56 adhered thereto is located at a rear end of the supporter main 44.

The case top 32 is bent to cover an edge of the liquid crystal display panel 36, and is installed to cover the side of the supporter main 44 where the reflection sheet 42, the backlight unit 40, the optical sheets 38, the liquid crystal display panel 36, and the polarizer 34 are sequentially stacked including edge surfaces and a side of the liquid crystal display panel 36. Accordingly, the case top 32 covers the supporter main 44, and affixes the reflection sheet 42, the backlight unit 40, the optical sheets 38, and the liquid crystal display panel 36 sequentially stacked on the upper part of the supporter main 44 to prevent any movement. In addition, the case top 32 encloses the edge surfaces of the liquid crystal display panel 36 to protect the liquid crystal display panel from external impact.

When the printed circuit board 54 folded at the rear end of the supporter main 44 moves, is it difficult to combine the backlight unit 40 with the printed circuit board 54. Accordingly, in order to prevent the printed circuit board 54 folded at the rear end of the supporter main 44 from moving, the liquid crystal display panel, as shown in FIG. 3, comprises a two-sided tape 60 attached between the supporter main 44 and the printed circuit board 54, wherein a first adhesive side of the two-sided tape 60 is attached to the supporter main 44, and the other adhesive side is attached to the printed circuit board 54 folded to the rear end of the supporter main 44. Accordingly, the two-sided tape 60 prevents the printed circuit board 54 from moving. However, since an additional process of attaching the two-sided tape 60 between the supporter main 44 and the printed circuit board 54 is required, productivity is lowered.

SUMMARY OF THE INVENTION

Accordingly, the present invention is directed to a liquid crystal display device and method of fabricating a liquid crystal display device that substantially obviates one or more of the problems due to limitations and disadvantages of the related art.

An object of the present invention to provide a liquid crystal display that prevents movement of a printed circuit board affixed on a supporter main.

Another object of the present invention to provide a method of fabricating a liquid crystal display that prevents movement of a printed circuit board affixed on a supporter main.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a liquid crystal display panel having a plurality of liquid crystal cells arranged in a matrix configuration, a printed circuit board having a drive circuit mounted thereon to drive the liquid crystal display panel, a supporter main for supporting the liquid crystal display panel, at least one hole formed in the printed circuit board, and at least one projected parts protruding from the supporter main, wherein the projected part is inserted into the hole to affix the printed circuit board to the supporter main.

In another aspect, a method of fabricating a liquid crystal display device includes providing a liquid crystal display panel having a plurality of liquid crystal cells arranged in a matrix configuration, providing a printed circuit board having a drive circuit mounted thereon to drive the liquid crystal display panel and at least one hole formed in the printed circuit board, providing a supporter main for supporting the liquid crystal display panel and forming at least one projected parts protruding from the supporter main, and inserting the projected part into the hole to affix the printed circuit board to the supporter main.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
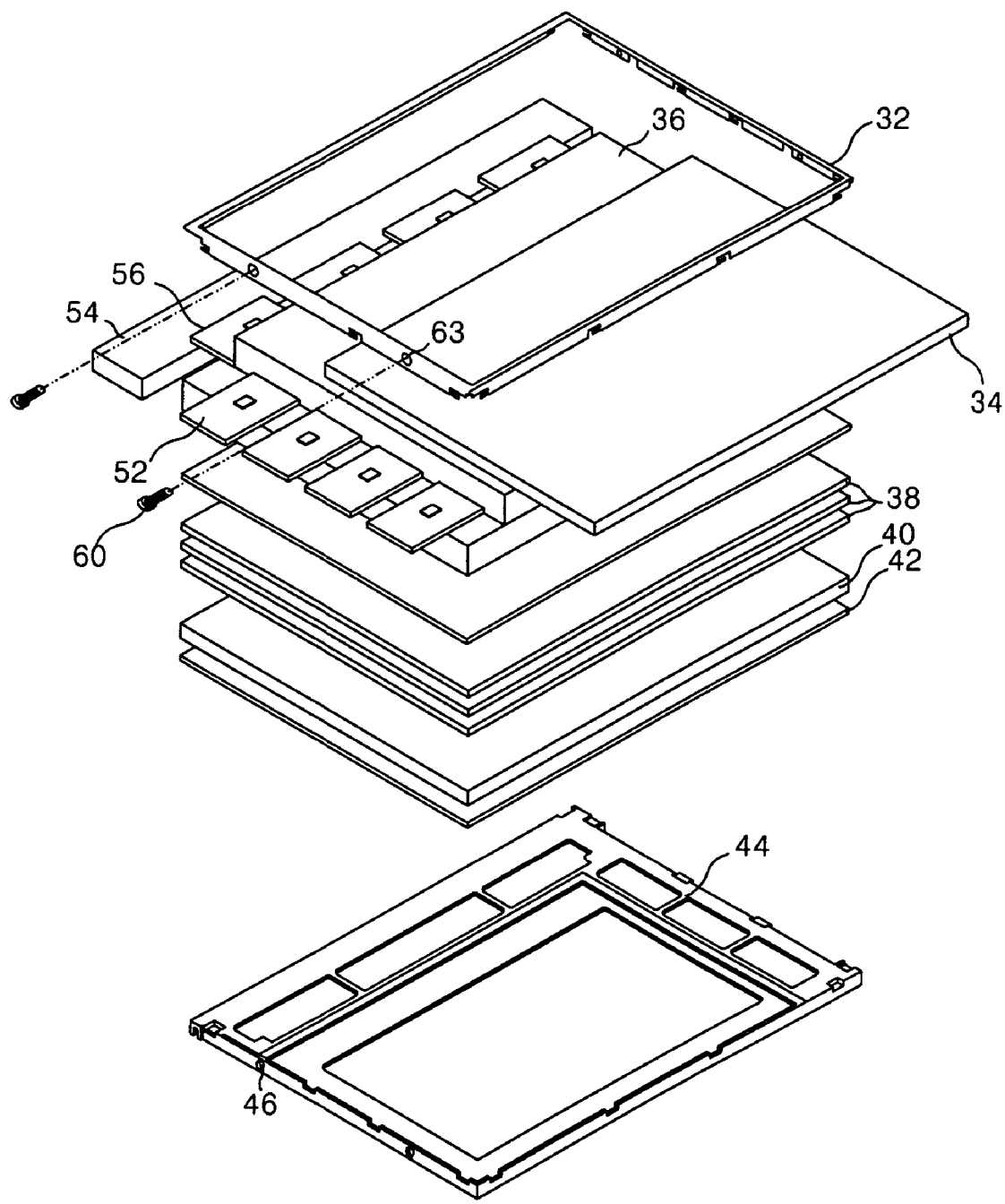
FIG. 1 is a perspective construction view of a liquid crystal display device according to the related art.
Figure 2:
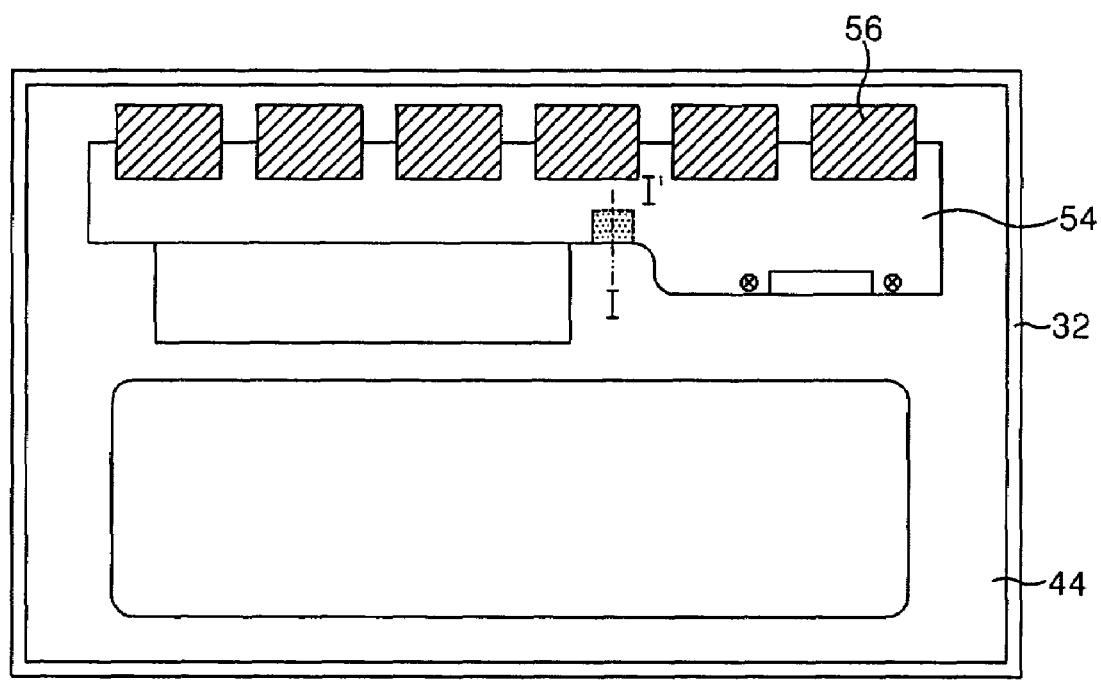
FIG. 2 is a diagram showing a rear supporter main of the printed circuit board of FIG. 1 according to the related art.
Figure 3:
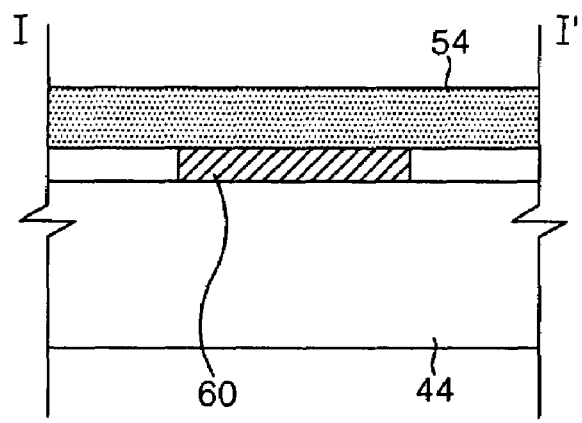
FIG. 3 is a cross sectional view along I–I' of FIG. 2 according to the related art.
Figure 4:
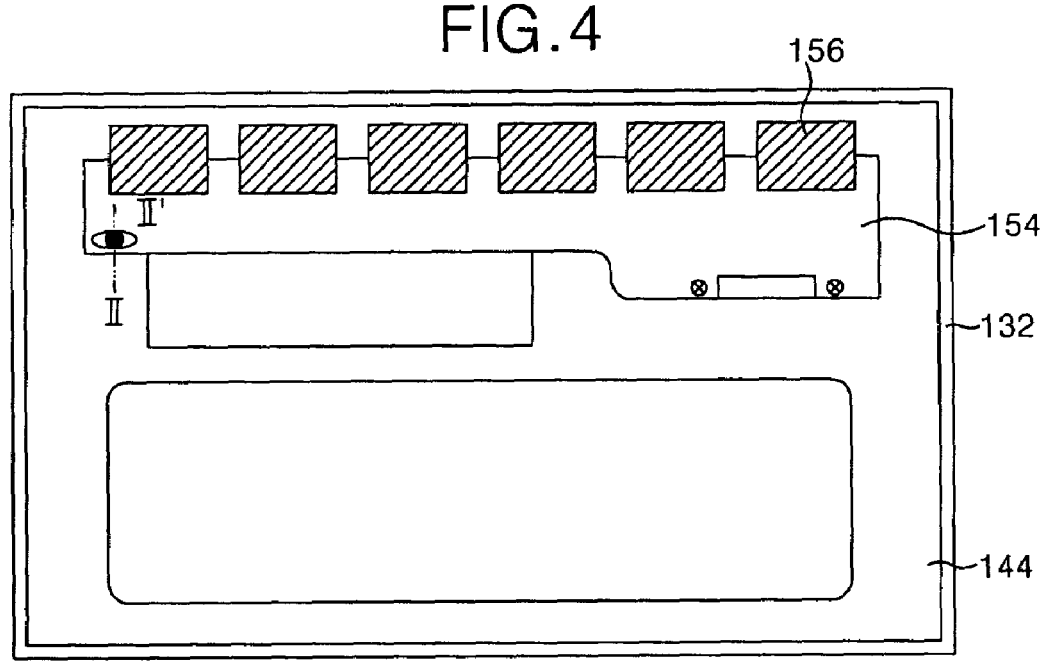
FIG. 4 is a diagram of an exemplary liquid crystal display according to the present invention.

FIG. 4 is a diagram of an exemplary liquid crystal display according to the present invention. In FIG. 4 a liquid crystal display may include a supporter main 144 made of plastic material(s), for example, and a case top 132 made of metal material(s), for example, that may be assembled the supporter main 144. Although not shown, the supporter main 144 may include a reflection sheet, a backlight unit, and optical sheets sequentially stacked on its surface, wherein the optical sheets may include a liquid crystal display panel and polarizers. Accordingly, the case top 132 may include stepped portions and a plurality of grooves are formed along side walls of the stepped portions, wherein a fastener, such as a screw, may be inserted into the grooves to assemble the supporter main 144 and the case top 132 within the supporter main 144.

Although not shown, the reflection sheet may guide light produced by the backlight unit toward a liquid crystal display panel, and the optical sheets may cause the incident light reflected from the reflection sheet to progress toward the liquid crystal display panel along a vertical direction. In addition, a polarizer may be provide to expand a viewing angle of images displayed on the liquid crystal display panel. A plurality of liquid crystal cells may be provided in the liquid crystal display panel and may be arranged in an active matrix between upper and lower glass substrates. In addition, each of the liquid crystal cells may include a thin film transistor for switching a video signal. Accordingly, the refractive index of each of the liquid crystal cells may be changed in accordance with the video signal, so the images corresponding to the video signal may be displayed.

Accordingly, a plurality of tape carrier packages (TCPs) 156 may be provided, which include driver integrated circuits for supplying drive signals to the thin film transistors, may be mounted onto the lower substrate of the liquid crystal display panel. The TCPs 156 may be divided on a printed circuit board 154 supplying the video signal to data lines of the liquid crystal display panel, wherein a data TCP 156 may be adhered to a data pad on the lower substrate and may have a data drive integrated circuit mounted thereon. In addition, the data drive integrated circuits may supply the video signals to the data lines in response to a control signal received from the printed circuit board 154, and a gate TCP may be adhered to a gate pad on the lower substrate and may have a gate drive integrated circuit mounted thereon, wherein the gate drive integrated circuit may supply the gate signals to the gate lines in response to a control signal received from the printed circuit board 154. The TCP 156 may be folded to cover side surfaces of the supporter main 144, wherein the printed circuit board 154 with the data TCP 156 may be adhered thereto and may be located at a rear end of the supporter main 144.

The case top 132 may be bent to cover an edge of the liquid crystal display panel 36, and may be installed to cover the side of the supporter main 144 where the reflection sheet, the backlight unit, the optical sheets, the liquid crystal display panel, and the polarizer are sequentially stacked including the edges surfaces and side of the liquid crystal display panel. The case top 132 may cover the supporter main 144 and may affix the reflection sheet, the backlight unit, the optical sheets, and the liquid crystal display panel sequentially stacked on the upper part of the supporter main 144 in order to restrain their movement. Accordingly, the case top 132 may enclose the edges of the liquid crystal display panel to protect the liquid crystal display panel from external impact.

Figure 5A:
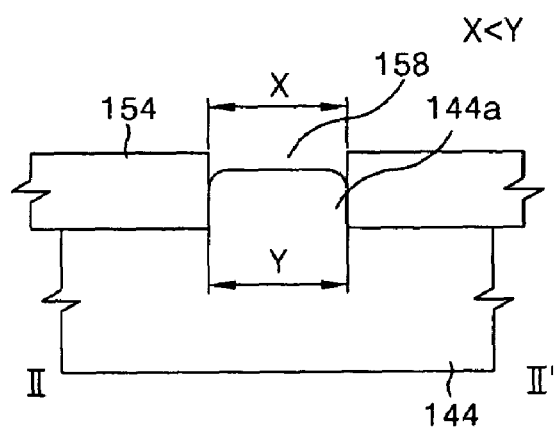
FIG. 5A is a cross sectional view along II–II' of the exemplary liquid crystal display device of FIG. 4 according to the present invention.
Figure 5B:
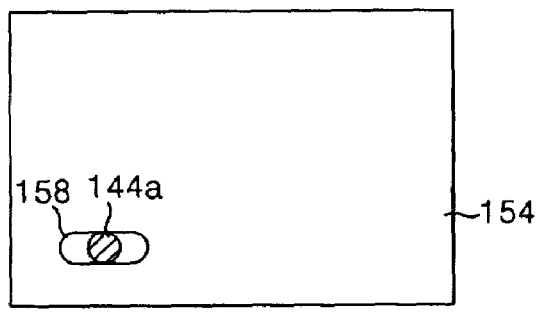
FIG. 5B is a plan view of an exemplary printed circuit board of the liquid crystal display device of FIG. 4 according to the present invention.

FIG. 5A is a cross sectional view along II–II' of the exemplary liquid crystal display device of FIG. 4 according to the present invention, and FIG. 5B is a plan view of an exemplary printed circuit board of the liquid crystal display device of FIG. 4 according to the present invention. In FIGS. 5A and 5B, when the printed circuit board 154 folded at the rear end of the supporter main 144 is allowed to move, assembly of the backlight unit and the printed circuit board 154 becomes difficult. Accordingly, in order to prevent the printed circuit board 154 folded at the rear end of the supporter main 144 from moving, the liquid crystal display includes at least one protrusion 144a formed at the rear of the supporter main 144 and at least one elliptical hole 158 provided on the printed circuit board 154. In addition, a circumference (Y) of the protrusion 156 may be set to be larger than a circumference (X) of the elliptical hole 158 by as much as about 0.02~0.05 mm.

Since the elliptical hole 158 of the printed circuit board 154 may be assembled relatively tightly with the protrusion 144a of the supporter main 144, the printed circuit board 154 may be prevented from moving. Accordingly, it is easy to assemble the printed circuit board 154 with the backlight unit (not shown). Furthermore, since the use of two-sided tape for affixing the printed circuit board 154 to the supporter main 144 may not be necessary, the fabrication costs are reduced.

Figure 6A:
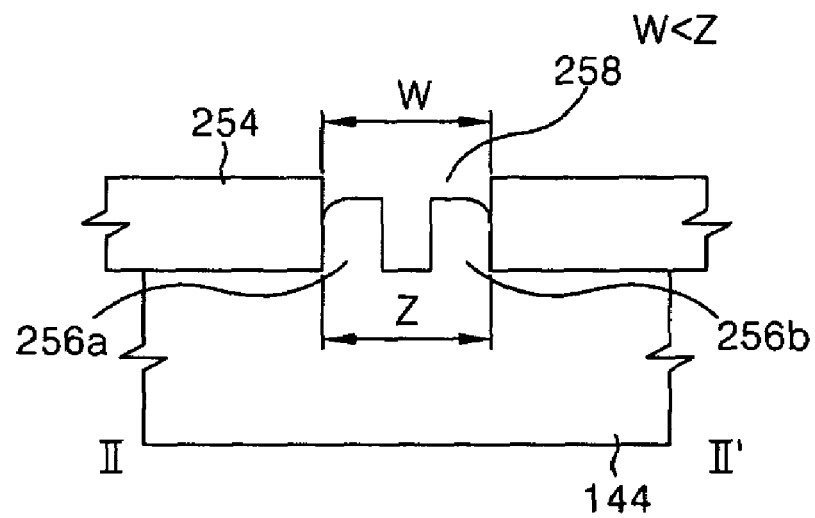
FIG. 6A is a cross sectional view along II–II' of another exemplary liquid crystal display device of FIG. 4 according to the present invention.
Figure 6B:
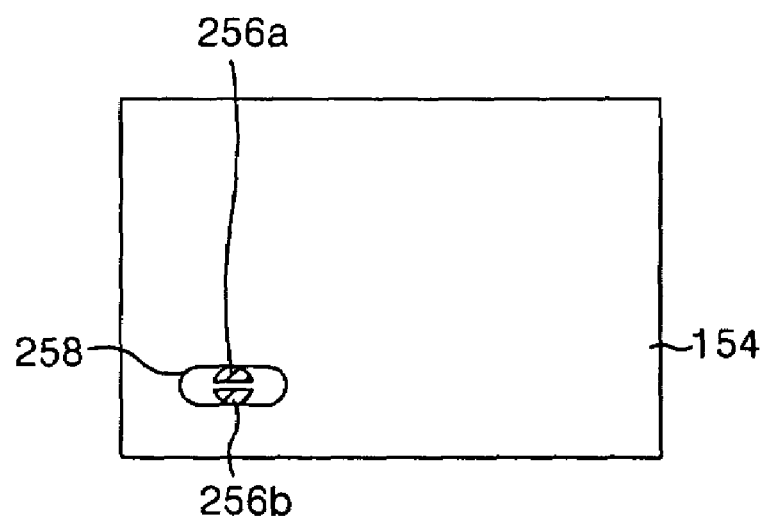
FIG. 6B is a plan view another exemplary printed circuit board of the liquid crystal display device of FIG. 4 according to the present invention.

FIG. 6A is a cross sectional view along II–II' of another exemplary liquid crystal display device of FIG. 4 according to the present invention, and FIG. 6B is a plan view another exemplary printed circuit board of the liquid crystal display device of FIG. 4 according to the present invention. In FIGS. 6A and 6B, to prevent the printed circuit board 154 folded at the rear of the supporter main 144 from moving, at least one pair of protrusions 256a and 256b may be formed on the rear surface of the supporter main 144. In addition, an elliptical hole 258 may be provided in the printed circuit board 154, and may be assembled with the pair of protrusions 256a and 256b.

The pair of protrusions 256a and 256b may have a semicircular shape and may project from the supporter main 144 to face each other and be separated by a first gap. Accordingly, a circumference (Z) of the pair of protrusions 256a and 256b may be larger than a circumference (W) of the elliptical hole 158 by as much as about 0.02~0.05 mm. Thus, the elliptical hole 258 of the printed circuit board 154 may apply pressure to each of the protrusions 256a and 256b along an inward direction to provide a relatively tight assembly. Accordingly, the elliptical hole 258 of the printed circuit board 154 and the pair of protrusions 256a and 256b of the supporter main 144 may prevent movement of the printed circuit board 154. Thus, assembly of the printed circuit board 154 and the backlight unit (not shown) may be firm. Furthermore, since two-sided tape for affixing the printed circuit board 154 to the supporter main 144 may not be necessary, fabrication costs are reduced.

It will be apparent to those skilled in the art that various modifications and variations can be made in the liquid crystal display device and method of fabricating a liquid crystal display device of the present invention without departing from the spirit of scope of the invention. Thus, it is intended that the present invention cover the modifications and variations of this invention provided they come within the scope of the appended claims and their equivalents.

What is claimed is:

1. A liquid crystal display device, comprising:
   a liquid crystal display panel having a plurality of liquid crystal cells arranged in a matrix configuration;
   a printed circuit board having a drive circuit mounted thereon to drive the liquid crystal display panel;
   a supporter main for supporting the liquid crystal display panel;
   at least one hole formed through a thickness the printed circuit board; and
   at least one projected part protruding from the supporter main,
   wherein the projected part is inserted into the hole to affix the printed circuit board to the supporter main and the projected part has a projecting length less than the thickness of the printed circuit board.

2. The device according to claim 1, wherein a diameter of the projected part is larger than a minor diameter of the hole by as much as about 0.02~0.05 mm.

3. The device according to claim 2, wherein the hole has an elliptical shape.

4. The device according to claim 1, wherein the projected part includes a plurality of protrusions separated from each other by a first gap.

5. The device according to claim 4, wherein the hole has an elliptical shape.

6. The device according to claim 5, wherein the first gap extends along a direction parallel to a major diameter of the elliptical shaped hole.

7. The device according to claim 1, wherein the hole has an elliptical shape.

8. A method of fabricating a liquid crystal display device, comprising:
   providing a liquid crystal display panel having a plurality of liquid crystal cells arranged in a matrix configuration;
   providing a printed circuit board having a drive circuit mounted thereon to drive the liquid crystal display panel and at least one hole formed through a thickness of the printed circuit board;
   providing a supporter main for supporting the liquid crystal display panel and forming at least one projected part protruding from the supporter main; and
   inserting the projected part into the hole to affix the printed circuit board to the supporter main,
   wherein a projecting length of the projected part is less than the thickness of the printed circuit board.

9. The method according to claim 8, wherein a diameter of the projected part is larger than a minor diameter of the hole by as much as about 0.02~0.05 mm.

10. The method according to claim 9, wherein the hole has an elliptical shape.

11. The method according to claim 8, wherein the projected part includes a plurality of protrusions separated from each other by a first gap.

12. The method according to claim 11, wherein the hole has an elliptical shape.

13. The method according to claim 12, wherein the first gap extends along a direction parallel to a major diameter of the elliptical shaped hole.

14. The method according to claim 8, wherein the hole has an elliptical shape.

* * * * *